(12) United States Patent
Luo et al.

(10) Patent No.: US 11,110,999 B1
(45) Date of Patent: Sep. 7, 2021

(54) BUOYAGE FOR EMERGENCY COMMUNICATION AND CORRESPONDING RESCUE METHOD

(71) Applicant: SHANGHAI OCEAN UNIVERSITY, Shanghai (CN)

(72) Inventors: Ruilong Luo, Shanghai (CN); Zhe Jiang, Shanghai (CN); Tingting Song, Shanghai (CN); Gaosheng Luo, Shanghai (CN); Weicheng Cui, Shanghai (CN)

(73) Assignee: SHANGHAI OCEAN UNIVERSITY, Shanghai (CN)

( * ) Notice: Subject to any disclaimer, the term of this patent is extended or adjusted under 35 U.S.C. 154(b) by 185 days.

(21) Appl. No.: 16/616,115

(22) PCT Filed: Mar. 22, 2019

(86) PCT No.: PCT/CN2019/079267
§ 371 (c)(1),
(2) Date: Nov. 22, 2019

(87) PCT Pub. No.: WO2019/233163
PCT Pub. Date: Dec. 12, 2019

(30) Foreign Application Priority Data

Jun. 8, 2018 (CN) .......................... 201810588054.2

(51) Int. Cl.
| | |
|---|---|
| *B63C 9/20* | (2006.01) |
| *B63B 22/20* | (2006.01) |
| *H04B 10/25* | (2013.01) |
| *B63B 39/02* | (2006.01) |
| *B63G 8/40* | (2006.01) |

(52) U.S. Cl.
CPC ................ *B63C 9/20* (2013.01); *B63B 22/20* (2013.01); *B63B 39/02* (2013.01); *H04B 10/25* (2013.01); *B63G 8/40* (2013.01)

(58) Field of Classification Search
CPC ........... B63C 9/20; B63B 22/20; B63B 39/02; B63G 8/40; H04B 10/25
See application file for complete search history.

(56) References Cited

U.S. PATENT DOCUMENTS

| | | | | |
|---|---|---|---|---|
| 3,893,201 A | * | 7/1975 | Mallory | .................. B63B 22/00 441/1 |
| 2007/0186837 A1 | * | 8/2007 | Bagley | ...................... B63G 8/22 114/333 |

FOREIGN PATENT DOCUMENTS

| | | | |
|---|---|---|---|
| CN | 102806979 A | * | 12/2012 |
| CN | 205801460 U | * | 12/2016 |

* cited by examiner

*Primary Examiner* — Stephen P Avila

(57) ABSTRACT

A buoyage for emergency communication and a corresponding rescue method are provided. The buoyage for emergency communication includes: a positioning device, a buoyancy block, a plurality of compression springs, an optical fiber, a reel, a frame, an optical fiber slip ring, a pure iron disk, an optical fiber connector and an oil-filled electromagnet, wherein the positioning device is fixed on a top portion of the buoyancy block, and is configured to emit a position signal of itself when the buoyage returns to a surface of water; the buoyancy block is provided above the frame, wherein the compression springs are provided between the buoyancy block and the frame; the pure iron disk is fixedly on a center of a bottom portion of the buoyancy block. The oil-filled electromagnet is adsorbed to the pure iron disk after being energized to limit a vertical displacement of the buoyancy block.

7 Claims, 2 Drawing Sheets

BUOYAGE FOR EMERGENCY COMMUNICATION AND CORRESPONDING RESCUE METHOD

CROSS REFERENCE OF RELATED APPLICATION

This is a U.S. National Stage under 35 U.S.C 371 of the International Application PCT/CN2019/079267, filed Mar. 22, 2019, which claims priority under 35 U.S.C. 119(a-d) to CN 201810588054.2, filed Jun. 8, 2018.

BACKGROUND OF THE PRESENT INVENTION

Field of Invention

The present invention relates to the technical filed of underwater rescue, and more particularly to a buoyage for emergency communication and a corresponding rescue method.

Description of Related Arts

For manned submersibles, the safety of the personnel in the sphere is the top priority. In the event of an emergency, the manned submersible is usually self-rescued by means of releasing ballast.

However, when the personnel in the sphere is not capable of completing the self-rescue operation for some reason, such as accidental coma due to severe impact, high carbon dioxide concentration, low temperature, etc., the surface mother ship can only call the sphere personnel through the underwater acoustic telephone, or contact other manned underwater vehicle to conduct the rescue operation, which will undoubtedly delay the rescue time and increase the probability of injury. At this time, if the communication link with the surface mother ship could be established in time, if the surface operators could assist or independently complete the releasing operation, the sphere personnel would still be saved. No technical solutions have been found that are particularly relevant.

SUMMARY OF THE PRESENT INVENTION

In view of the above problems existed in the conventional arts, the present invention provides a buoyage for emergency communication and a corresponding rescue method, so that the manned submersible is no longer isolated after being in danger under water; if necessary, a mother ship on surface is capable of directly intervening to complete operations of releasing a ballast and ascending, etc., and also capable of providing guidance for later rescue, wherein the target is more clear, and the safety of underwater operations is improved.

Thus, the present invention adopts technical solutions as follows.

A buoyage for emergency communication comprises: a positioning device, a buoyancy block, a plurality of compression springs, an optical fiber, a reel, a frame, an optical fiber slip ring, a pure iron disk, an optical fiber connector and an oil-filled electromagnet, wherein the positioning device is fixed on a top portion of the buoyancy block, and is configured to emit a position signal of itself when the buoyage returns to a surface of water; the buoyancy block is provided above the frame, wherein the compression springs are provided between the buoyancy block and the frame; the pure iron disk is fixedly connected on a bottom portion of the buoyancy block; the oil-filled electromagnet is fixed on the frame and below the buoyancy block, the oil-filled electromagnet adsorbed to the pure iron disk after being energized to limit a vertical displacement of the buoyancy block; a limiting rod is provided on an upper portion of the frame for limiting a horizontal displacement of the buoyancy block; the optical fiber is wound on the reel and below the frame for transmitting data and controlling instruction; a first end of the optical fiber is connected with the optical fiber connector and detachably fixed on a bottom of the buoyancy block, and can be removed if necessary; a second end of the optical fiber passes through a central hallow of the reel to connect the optical fiber slip ring.

Preferably, the buoyage for emergency communication further comprises a protective cover, wherein the protective cover is provided on a top of the buoyancy block, so as to protect the positioning device and prevent the positioning device from being damaged by bumps.

Preferably, the positioning device comprises a power source and a flasher light.

Preferably, the compression springs all have identical height and are all provided between the buoyancy block and the frame.

Preferably, a fiber led from the optical fiber slip ring is for connecting a manned compartment, so as to keep fiber transmission uninterrupted.

Preferably, the oil-filled electromagnet adopts pressure compensation principle and no special pressure-resistant design is required, wherein a power supply is provided by the submersible power system.

A rescue method applying the buoyage for emergency communication, comprises steps of:

step (1): when the oil-filled electromagnet is powered down caused by failure of a manned submersible and attraction between the oil-filled electromagnet and the pure iron disk is lost, releasing the buoyancy block, wherein the buoyancy block accelerates upward under action of the compression spring;

step (2): after the buoyancy block floats up to a water surface, emitting a position signal by the positioning device, and a mother ship on the water surface determines a position of the buoyancy block by the positioning device;

step (3): unplugging the fiber connector below the buoyancy block and connecting the fiber connector with a mother ship control room to establish a communication link between the mother ship and the manned submersible; and step (4): carrying out corresponding rescue according to a sphere condition of the manned submersible by the mother ship on the water surface comprising assisting to resurface, remotely controlling releasing the ballast, and calling other submersibles to carry out rescue.

Compared with the conventional art, the beneficial effects of the present invention are as follows.

(1) When the manned submersible is in distress under water, it is no longer isolated.

(2) When necessary, the mother ship on water surface is capable of directly intervening to complete the operation of releasing the ballast and ascending, etc., and also capable of providing guidance for later rescue, and in such a manner that the target is more clear, which improves the safety of underwater operations.

(3) The equipment is simple and reliable, flexible and convenient to use, without adding extra burden.

DESCRIPTION OF REFERENCE OF THE DRAWINGS

1—protective cover; 2—positioning device; 3—buoyancy block; 4—compression spring; 5—optical fiber; 6—reel; 7—frame; 8—optical fiber slip ring; 9—pure iron disk; 10—optical fiber connector; 11—oil-filled electromagnet.

DETAILED DESCRIPTION OF THE PREFERRED EMBODIMENT

The present invention is described in detail below with reference to the accompanying drawings and specific embodiments. The specific embodiments and the description are merely illustrative of the present invention and are not intended to limit the present invention.

Figure 1:
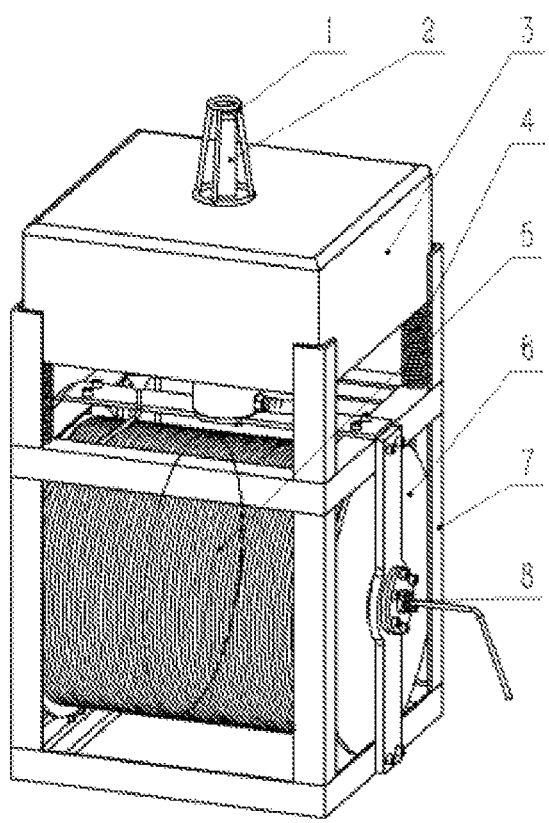
FIG. 1 is an isometric side view of a buoyage for emergency communication according to a preferred embodiment of the present invention.
Figure 2:
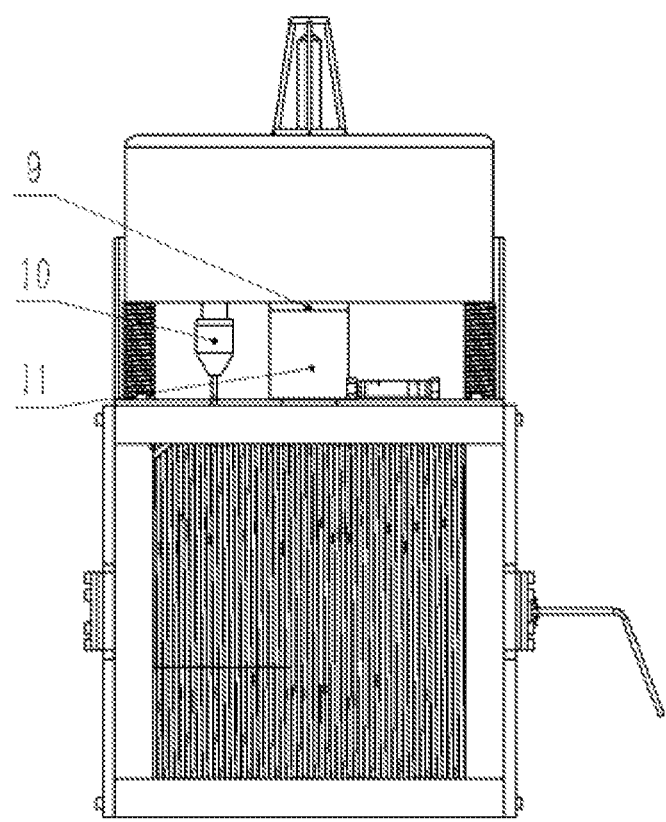
FIG. 2 is a front elevational view of the buoyage for emergency communication (with portions of a frame and compression spring removed) according to the preferred embodiment of the present invention.

As shown in FIG. 1 and FIG. 2, the present invention discloses a buoyage for emergency communication, comprising: a positioning device 2, a buoyancy block 3, a plurality of compression springs 4, an optical fiber 5, a reel 6, a frame 7, an optical fiber slip ring 8, a pure iron disk 9, an optical fiber connector 10 and an oil-filled electromagnet 11, wherein the positioning device 2 is fixed on a top portion of the buoyancy block 3, and is configured to emit a position signal of itself when the buoyage returns to a surface of water; the buoyancy block 3 is provided above the frame 7, wherein the compression springs 4 are provided between the buoyancy block 3 and the frame 7; the pure iron disk 9 is fixedly connected on a bottom portion of the buoyancy block 3; the oil-filled electromagnet 11 is fixed on the frame 7 and below the buoyancy block 3, the oil-filled electromagnet 11 adsorbed to the suction cup 9 after being energized to limit a vertical displacement of the buoyancy block 3; a limiting rod is provided on an upper portion of the frame 7 for limiting a horizontal displacement of the buoyancy block 3; the optical fiber 5 is wound on the reel 6 and below the frame 7 for transmitting data and controlling instruction; a first end of the optical fiber 5 is connected with the optical fiber connector 10 and detachably fixed on a bottom of the buoyancy block 3, and can be removed if necessary; a second end of the optical fiber 5 passes through a central hallow of the reel 6 to connect the optical fiber slip ring 8.

Preferably, the buoyage for emergency communication further comprises a protective cover 1, wherein the protective cover 1 is provided on a top of the buoyancy block 3, so as to protect the positioning device 2 and prevent the positioning device 2 from being damaged by bumps.

Preferably, the positioning device 2 comprises a power source and a flasher light.

Preferably, the compression springs 4 all have identical height and are all provided between the buoyancy block 3 and the frame 7.

Preferably, a fiber led from the optical fiber slip ring 8 is for connecting a manned compartment, so as to keep fiber transmission uninterrupted.

Preferably, the oil-filled electromagnet 11 adopts pressure compensation principle and no special pressure-resistant design is required, wherein a power supply is provided by the submersible power system.

A rescue method applying the buoyage for emergency communication, comprises steps of:

step (1): when the oil-filled electromagnet 11 is powered down caused by failure of a manned submersible and attraction between the oil-filled electromagnet 11 and the pure iron disk 9 is lost, releasing the buoyancy block 3, wherein the buoyancy block 3 accelerates upward under action of the compression spring 4;

step (2): after the buoyancy block 3 floats up to a water surface, emitting a position signal by the positioning device 2, and a mother ship on the water surface determines a position of the buoyancy block 3 by the positioning device 2;

step (3): unplugging the fiber connector 10 below the buoyancy block 3 and connecting the fiber connector 10 with a mother ship control room to establish a communication link between the mother ship and the manned submersible; and step (4): carrying out corresponding rescue according to a sphere condition of the manned submersible by the mother ship on the water surface comprising assisting to resurface, remotely controlling releasing a ballast, and calling other submersibles to carry out rescue.

Embodiment 1

A working principle of the buoyage for emergency communication is as follows. By program setting (if there is no manual operation for a long time, it is determined that there is an accident in the sphere), or personnel in the sphere actively operate when necessary, or the power supply system is in failure, etc., so that the electromagnetic iron is powered down and the buoyancy block is released. After a period of time, the buoyancy block returns to a water surface with communication fiber. The mother ship on a water surface searches and recovers the emergency buoy through the information given by the positioning device. The fiber optic connector below the buoyancy block is connected to the control room on a water surface to establish fiber optic communication between the mother ship control room on the water surface and the manned submersible waiting for rescue. If the personnel in the manned submersible sphere return to working status, surface command and intercommunication information may be provided to assist in resurfacing; if the working status of the personnel in the sphere still not resumed, the operation is performed, similarly to the unmanned remotely operated submersible, to perform remotely releasing the ballast. After releasing the ballast, if the submersible still cannot be resurfaced, tangible fiber can also be used as a guide line, which facilitates other manned submersibles to quickly find a wrecked submersible and implement rescue.

Action relationships of the whole device are as follows: (1) For some reason (as in the foregoing case), the oil-filled electromagnet 11 is powered down, the buoyancy block 3 is released, and the compression spring 4 provides a certain initial velocity for the buoyancy block 3 to accelerate the ascending. (2) After the buoyancy block 3 returns to the water surface, the mother ship on the water surface determines its position by the positioning device 2 and recovers the buoyancy block 3. (3) Unplug the optical fiber connector 10 below the buoyancy block 3 and connect to the control room of the mother ship to establish the mother ship and the submersible. (4) Depends on the condition of the manned submersible personnel sphere, the mother ship on the water surface assists the submersible to resurface, or remotely handles the ballast releasing, or calls other submersibles to carry out rescue.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A buoyage for emergency communication comprising: a positioning device (2), a buoyancy block (3), a plurality of compression springs (4), an optical fiber (5), a reel (6), a frame (7), an optical fiber slip ring (8), a pure iron disk (9), an optical fiber connector (10) and an oil-filled electromagnet (11), wherein the positioning device (2) is fixed on a top portion of the buoyancy block (3), and is configured to emit a position signal of itself when the buoyage returns to a surface of water; the buoyancy block (3) is provided above the frame (7), wherein the compression springs (4) are provided between the buoyancy block (3) and the frame (7); the pure iron disk (9) is fixedly connected on a bottom portion of the buoyancy block (3); the oil-filled electromagnet (11) is fixed on the frame (7) and below the buoyancy block (3), the oil-filled electromagnet (11) adsorbed to the pure iron disk (9) after being energized to limit a vertical displacement of the buoyancy block (3); a limiting rod is provided on an upper portion of the frame (7) for limiting a horizontal displacement of the buoyancy block (3); the optical fiber (5) is wound on the reel (6) and below the frame (7) for transmitting data and controlling instruction; a first end of the optical fiber (5) is connected with the optical fiber connector (10) and detachably fixed on a bottom of the buoyancy block (3), and can be removed if necessary; a second end of the optical fiber (5) passes through a central hallow of the reel (6) to connect the optical fiber slip ring (8).

2. The buoyage for emergency communication, as recited in claim 1, further comprising a protective cover (1), wherein the protective cover (1) is provided on a top of the buoyancy block (3), so as to protect the positioning device (2) and prevent the positioning device (2) from being damaged by bumps.

3. The buoyage for emergency communication, as recited in claim 1, wherein the positioning device (2) comprises a power source and a flasher light.

4. The buoyage for emergency communication, as recited in claim 1, wherein the compression springs (4) all have identical height and are all provided between the buoyancy block (3) and the frame (7).

5. The buoyage for emergency communication, as recited in claim 1, wherein a fiber led from the optical fiber slip ring (8) is for connecting a manned compartment, so as to keep fiber transmission uninterrupted.

6. The buoyage for emergency communication, as recited in claim 1, wherein the oil-filled electromagnet (11) adopts pressure compensation principle and no special pressure-resistant design is required, wherein a power supply is provided by the submersible power system.

7. A rescue method applying the buoyage for emergency communication, as recited in claim 1, comprising steps of:

step (1): when the oil-filled electromagnet (11) is powered down caused by failure of a manned submersible and attraction between the oil-filled electromagnet (11) and the pure iron disk (9) is lost, releasing the buoyancy block (3), wherein the buoyancy block (3)) accelerates upward under action of the compression spring (4);

step (2): after the buoyancy block (3) floats up to a water surface, emitting a position signal by the positioning device (2), and a mother ship on the water surface determines a position of the buoyancy block (3) by the positioning device (2);

step (3): unplugging the fiber connector (10) below the buoyancy block (3) and connecting the fiber connector (10) with a mother ship control room to establish a communication link between the mother ship and the manned submersible; and step (4): carrying out corresponding rescue according to a sphere condition of the manned submersible by the mother ship on the water surface comprising assisting to resurface, remotely controlling releasing a ballast, and calling other submersibles to carry out rescue.

* * * * *